US011256232B2

(12) United States Patent
Rokach et al.

(10) Patent No.: US 11,256,232 B2
(45) Date of Patent: Feb. 22, 2022

(54) THERMAL MITIGATION WITHIN A CONVERGED RADIO DEVICE

(71) Applicant: MOTOROLA SOLUTIONS, INC., Chicago, IL (US)

(72) Inventors: Yehuda Rokach, Ashkelon (IL); Mark Antilla, Davie, FL (US); Mark A. Boerger, Plantation, FL (US); David H. McClintock, Boynton Beach, FL (US); Liang Xu, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 349 days.

(21) Appl. No.: 16/513,503

(22) Filed: Jul. 16, 2019

(65) Prior Publication Data
US 2021/0018899 A1    Jan. 21, 2021

(51) Int. Cl.
*G05B 19/4155* (2006.01)
*G06F 1/20* (2006.01)

(52) U.S. Cl.
CPC ......... *G05B 19/4155* (2013.01); *G06F 1/206* (2013.01); *G05B 2219/49216* (2013.01); *Y02D 30/00* (2018.01)

(58) Field of Classification Search
CPC ...... G05B 19/4155; G05B 2219/49216; G06F 1/206; H04B 1/036; H04B 1/40; Y02D 30/00
See application file for complete search history.

(56) References Cited

U.S. PATENT DOCUMENTS

| | | | |
|---|---|---|---|
| 9,582,012 B2 | 2/2017 | Park et al. | |
| 9,749,740 B2 | 8/2017 | Borkhovik et al. | |
| 9,823,673 B2 | 11/2017 | Park et al. | |
| 9,977,439 B2 | 5/2018 | Park et al. | |
| 10,114,443 B2 | 10/2018 | Mittal et al. | |
| 10,725,531 B1 * | 7/2020 | Ichapurapu | G06F 1/324 |

(Continued)

FOREIGN PATENT DOCUMENTS

| | | |
|---|---|---|
| WO | 2013185004 A1 | 12/2013 |
| WO | 2015157112 A1 | 10/2015 |

OTHER PUBLICATIONS

International Search Report and Written Opinion for Application No. PCT/US2020/042144 dated Nov. 10, 2020 (14 pages).

*Primary Examiner* — Chun Cao
(74) *Attorney, Agent, or Firm* — Michael Best & Friedrich LLP

(57) ABSTRACT

A method and device for thermal mitigation. The communications device including a first radio communications subsystem configured to operate according to a first radio communications protocol and a second radio communications subsystem configured to operate according to a second radio communications protocol. The first radio communications subsystem includes a temperature sensor and an electronic processor configured to determine, via the temperature sensor, a first temperature indicative of a temperature of the second radio communications subsystem, compare the first temperature to at least one predetermined temperature threshold, and deactivate the second radio communications subsystem when the first temperature exceeds a predetermined temperature threshold of the at least one predetermined temperature threshold.

14 Claims, 6 Drawing Sheets

(56) References Cited

U.S. PATENT DOCUMENTS

| | | | |
|---|---|---|---|
| 2005/0010827 A1 | 1/2005 | McAfee et al. | |
| 2007/0074071 A1 | 3/2007 | Rothman et al. | |
| 2009/0290625 A1* | 11/2009 | Riddle | G06F 1/206 |
| | | | 375/222 |
| 2011/0138395 A1 | 6/2011 | Wolfe | |
| 2012/0075992 A1* | 3/2012 | Shahidi | H04W 52/0251 |
| | | | 370/235 |
| 2013/0332720 A1* | 12/2013 | Gupta | G06F 9/4893 |
| | | | 713/100 |
| 2015/0288792 A1* | 10/2015 | Nayak | G06F 1/206 |
| | | | 455/558 |
| 2020/0329431 A1* | 10/2020 | Yu | H04M 1/0279 |

\* cited by examiner

THERMAL MITIGATION WITHIN A CONVERGED RADIO DEVICE

BACKGROUND OF THE INVENTION

Converged communications devices include multiple subsystems, each of which may be configured to communicate with a particular radio communications network. Temperature caused by the operating environment, operation of one or more of these subsystems, or some combination thereof may impact performance of the communications device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
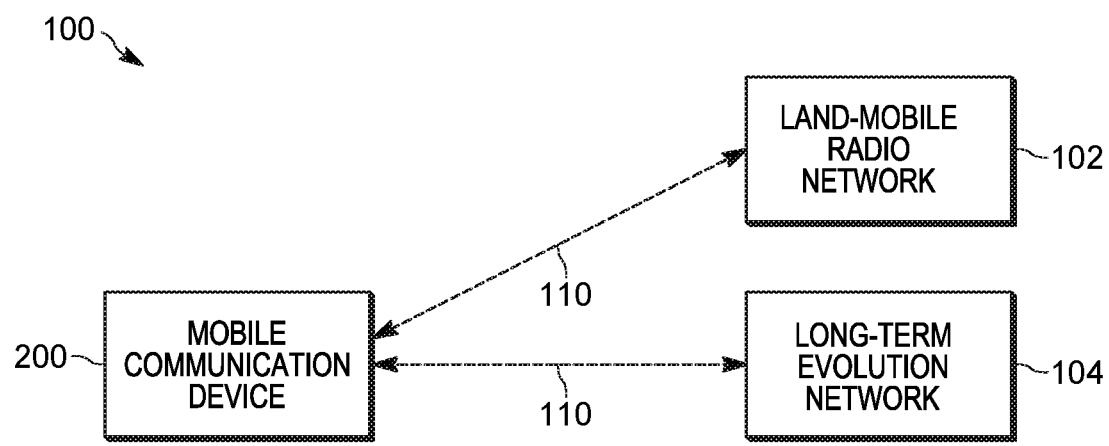
FIG. 1 is a block diagram illustrating a multiple network system interacting with a converged wireless communication device.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, converged communications devices house several different hardware subsystems in a single housing. Other types of communication and computing devices may also house several different hardware subsystems in a single housing. Each subsystem may be affected by temperature of the other subsystem. In other words, in some instances a heat-transferring relationship exists between the two subsystems such that the operating temperatures of each are dependent on the other. Although such subsystems may include their own thermal mitigation hardware and/or procedures, the temperature within a device housing may rise or lower to a level where operation of a subsystem may be adversely impacted and, in extreme temperature cases, result in permanent damage. It is also desirable to adjust the subsystem operations or to prevent the subsystem from even activating in such temperatures.

To prevent damage to a subsystem, one solution may be placement of a temperature sensor on one radio and controlling thermal migration of that subsystem via another subsystem of the device. However, board-to-board interconnect limitations and mechanical constraints generally make implementing such an option impractical. Accordingly, embodiments described herein provide, among other things, a device and method of thermal mitigation between two or more radio communications subsystems.

One example embodiment provides a communications device including a first radio communications subsystem configured to operate according to a first radio communications protocol and a second radio communications subsystem configured to operate according to a second radio communications protocol that is a different protocol than the first radio communications protocol. The first radio communications subsystem includes a temperature sensor and an electronic processor configured to determine, via the temperature sensor, a first temperature indicative of a temperature of the second radio communications subsystem, compare the first temperature to at least one predetermined temperature threshold, and deactivate the second radio communications subsystem when the first temperature exceeds a predetermined temperature threshold of the at least one predetermined temperature threshold.

Another example embodiment provides a method of thermal mitigation in a communications device. The method includes determining, via a temperature sensor of a first radio communications subsystem configured to operate according to a first radio communications protocol, a first temperature indicative of a temperature of a second radio communications subsystem configured to operate according to a second radio communications protocol that is a different protocol than the first radio communications protocol, comparing the first temperature to at least one predetermined temperature threshold, and deactivating the second radio communications subsystem when the first temperature exceeds a predetermined temperature threshold of the at least one predetermined temperature threshold, deactivating the second radio communications subsystem.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

FIG. 1 is a block diagram of an exemplary multiple network system 100. FIG. 1 shows one example of a network in which the invention may be implemented. This example is for illustrative purposes only and the invention may be implemented on other networks. In the example shown, the multiple network system 100 includes a first communications network 102 and a second communications network 103. In the illustrated embodiment, the first communications network 102 is a land mobile radio (LMR) network and the second communications network 103 is a broadband communications network (for example, Long-Term Evolution or LTE). It should be understood that each of the communications networks 102 and 103 may be another kind of network, including future developed networks, Wi-Fi networks, and Bluetooth networks. The first communication network 102 may be the same or a different network type as the second communication network 103. In some embodiments, the multiple network system 100 includes more than one of the networks 102 and 103. Also, one skilled in the art would understand that the networks are more complex than the schematic elements shown in FIG. 1 depict.

A communication device 200 communicates with the first communications network 102 and the second communications network 103. The communication device 200 may be a converged device that incorporates components (e.g., hardware and software) to permit communications via two or more modalities. For example, the converged device may independently communicate with the first communications network 102, the second communications network 103, or more communications networks. The communication device 200 may also be a tablet computer, a personal digital assistant (PDA), or another computing device.

Figure 2:
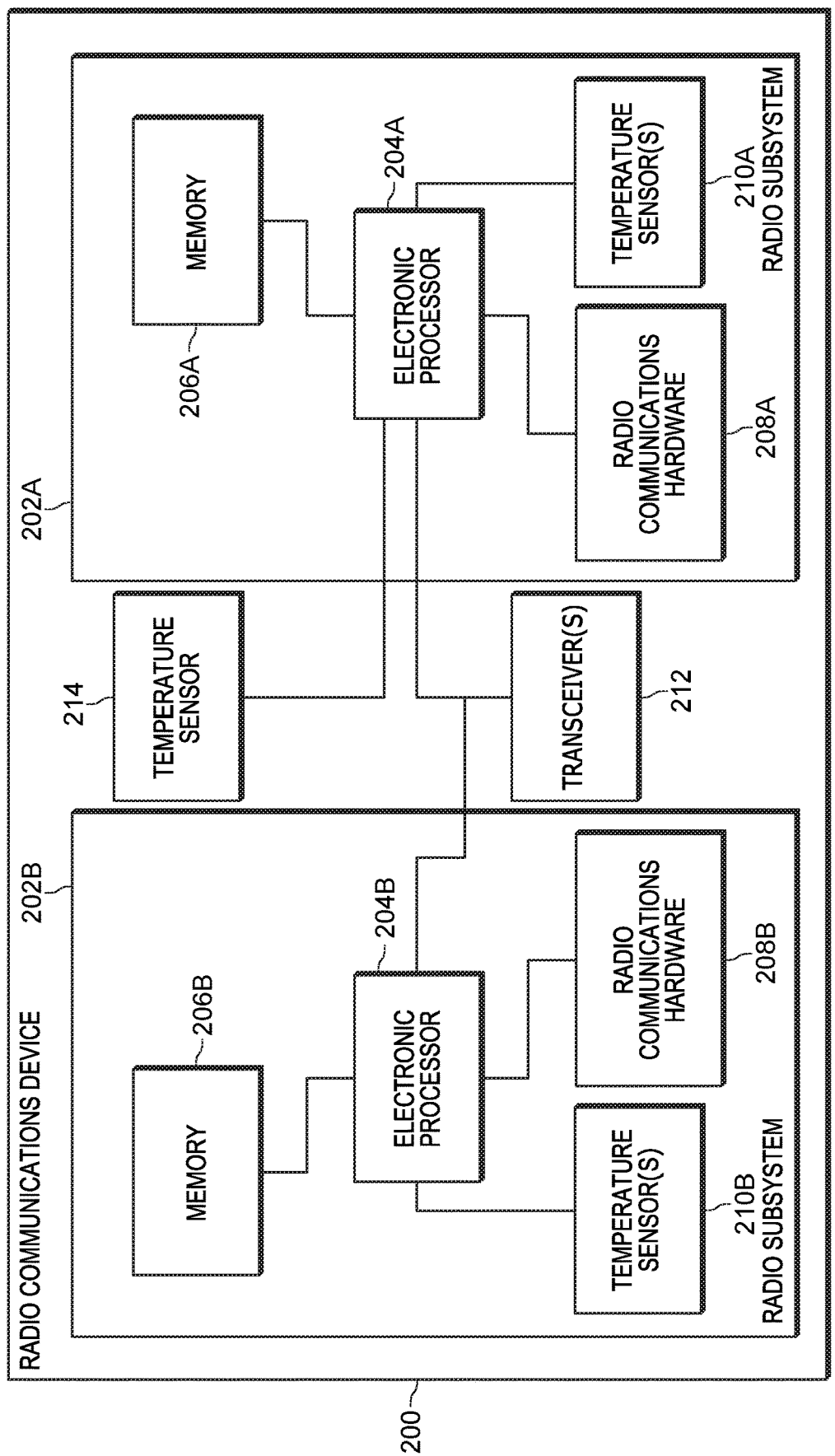
FIG. 2 is a block diagram illustrating the converged communications device capable of being used in the multiple network system of FIG. 1.

FIG. 2 illustrates a block diagram of the communication device 200 in accordance with some embodiments. For ease of description, although the communication device 200 understandably includes more components (for example, electronic processors, memory and other storage elements, transceivers, codecs, signal processing components, and so on), only those relevant in describing the invention are described in detail herein. The communication device 200 includes a first radio communications subsystem 202A and a second radio communications subsystem 202B. Each of the radio communications subsystems 202A and 202B are configured to operate according to a particular radio communications protocol. For example, the first radio communications subsystem 202A is configured to communicate over the first radio communications network 102 and the second radio communications subsystem 202B is configured to communicate over the second radio communications network 103. The communication device 200 includes at least one transceiver 212 used by the subsystems 202A and 202B to communicate over the networks 102 and 103 respectively. The transceiver 212 is capable of transmitting and receiving radio frequency signals. Other embodiments include other types of transceivers including, but not limited to, radio frequency modems, frequency modulation two-way radios, LTE transceivers, code division multiple access (CDMA) transceivers, Wi-Fi modules, etc. In some embodiments, each of the subsystems 202A and 202B utilize separate transceivers.

The first radio communications subsystem 202A includes a first electronic processor 204A, a memory 206A, radio communications hardware 208A, and one or more temperature sensors 210A. The radio communications hardware 208A includes any radio communication devices, components, and circuitry necessary for the radio communications subsystem 202A to communicate, using the one or more transceivers 212, over the radio communications network 102. The temperature sensors 210A are positioned within and/or around the radio communications subsystem 202A such that the temperature sensors 210A measure the temperature of the components and/or environmental temperature of the first radio communications subsystem 202A.

The electronic processor 204A obtains and provides information (for example, from the memory 206A, the transceiver 212, the radio communications hardware 208A, and the one or more temperature sensors 210A) and processes the information by executing one or more software instructions or modules, capable of being stored, for example, in a random access memory ("RAM") area of the memory 206A, a read only memory ("ROM") of the memory 206A, or another non-transitory computer readable medium (not shown). The software can include firmware, one or more applications, program data, filters, rules, one or more program modules, and other executable instructions. The electronic processor 204A is configured to retrieve from the memory 206A and execute, among other things, software related to the control processes and methods described herein.

The memory 206A can include one or more non-transitory computer-readable media, and includes a program storage area and a data storage area. The program storage area and the data storage area can include combinations of different types of memory, as described herein. The memory 206A may take the form of any non-transitory computer-readable medium. In the embodiment illustrated, the memory 206A stores, among other things, instructions for thermal mitigation techniques (actions to preserve the subsystem 202A and/or device 200 from damage due to environmental and/or operating temperature). The electronic processor 204A implements one or more thermal mitigation techniques based on the measurements from the one or more temperature sensors 210A.

The second communications subsystem 202B also includes an electronic processor 204B, a memory 206B, radio communications hardware 208B, and one or more temperature sensors 210B, each of which may be configured similar to the electronic processor 204A, memory 206A, radio communications hardware 208A, and one or more temperature sensors 210A respectively. In other embodiments the radio communications hardware 208A may differ from the radio communications hardware 208B. For example, as noted above, in some embodiments, the second radio communications subsystem 202B may be configured to communicate according to a radio communications protocol (i.e. over a radio communications network) that is a different protocol than that of the first radio communications subsystem 202A. For example, the first radio communications protocol may be a land mobile radio protocol and the second radio communications protocol may be a broadband protocol. It should be understood that, in further embodiments, that either of the radio communications subsystems 202A and 202B may be configured for other radio communications protocols (for example, those described above). In some embodiments, the memory 206A and 206B may be a single memory shared between the first subsystem 202A and second subsystem 202B.

The radio communications subsystem 202A is also coupled to a temperature sensor 214. The temperature sensor 214 is positioned outside of the radio communications subsystem 202A such that the temperature detected by the temperature sensor 214 is indicative of the temperature of or of the environment surrounding the second radio communications subsystem 202B. In some embodiments, the sensor 214 is positioned within the radio communications subsystem 202B (for example, on a printed circuit board or within a housing of the second radio communications subsystem 202B). In other embodiments, the sensor 214 is positioned outside of the radio communications subsystem 202B (for example, between the first radio communications subsystem 202A and second radio communications subsystem 202B such that the sensor 214 measures the temperature property of both subsystem 202A and 202B). The electronic processor 204B also implements one or more thermal mitigation techniques based on the measurements from the one or more temperature sensors 210B. In some embodiments, the temperature range in which the first radio communications subsystem 202A may operate safely is different than the temperature range in which the second radio communications subsystem 202B may safely operate. In some embodiments, the first radio communications subsystem 202A and the second radio communications subsystem 202B may be positioned proximate enough to each other that operations (including thermal mitigation) of each may directly affect the temperature of or surrounding the other radio communications subsystem. The first radio communications subsystem 202A may be more important or critical to a user operating the device, more durable when operating in severe thermal conditions, or both than the second radio communications subsystem 202B. Thus, it may be beneficial for the second radio communications subsystem 202B to be deactivated in such severe thermal conditions.

In some embodiments, the first radio communications subsystem 202A may use readings from the temperature sensor 214 to implement thermal mitigations against the second radio communications subsystem 202B. In some embodiments, the first radio communications subsystem may use readings of the temperature sensor 210A to correlate against predicted temperatures in the second radio communications subsystem 202B and implement thermal mitigations against the second radio communications subsystem 202B.

Figure 3:
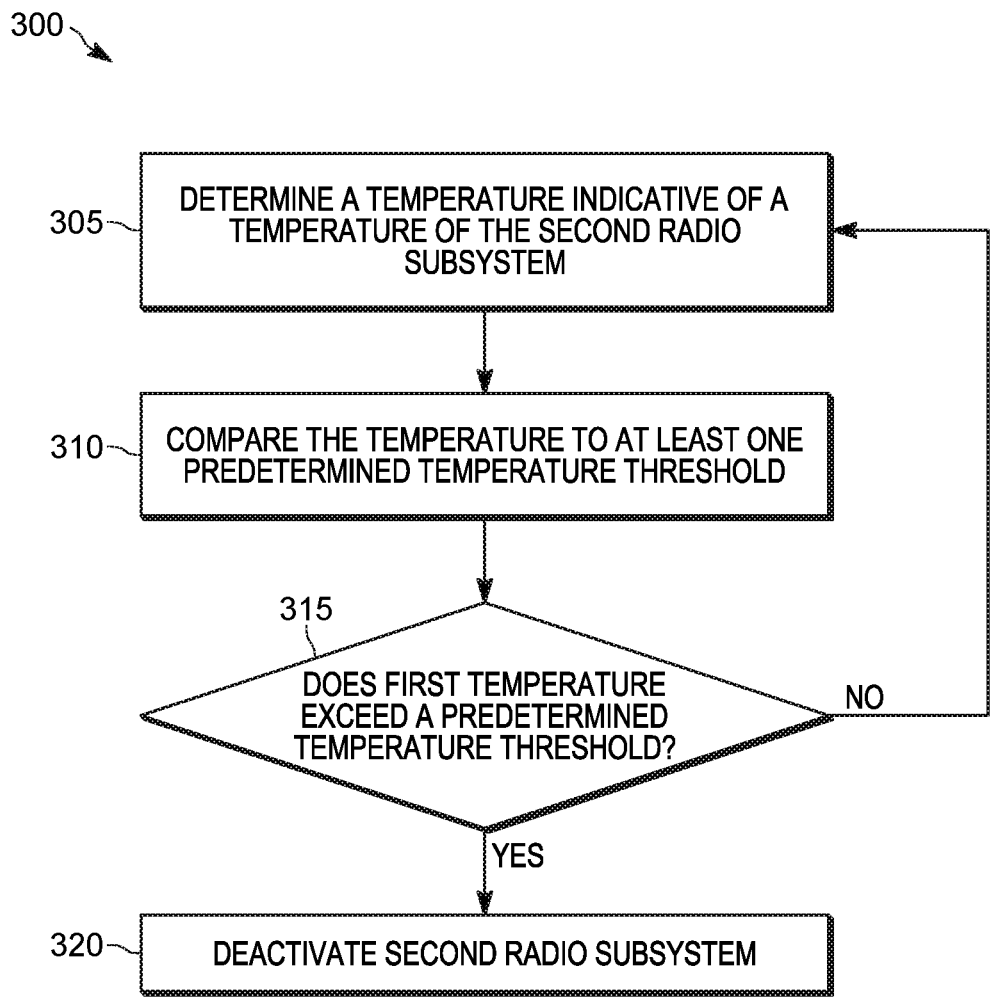
FIG. 3 is a flowchart of a first part of a method of thermal mitigation implemented by the converged communications device of FIG. 2.

FIG. 3 is a flowchart illustrating a method 300 implemented by the communications device 200. In the example illustrated, the method 300 is implemented by the subsystem 202A (specifically, the electronic processor 204A). At block 305, the electronic processor 204A determines, via the temperature sensor 214, a temperature indicative of (or correlating to) a temperature of the second radio communications subsystem 202B. A temperature of the radio communications subsystem 202B may be a temperature of the second radio communications subsystem 202B itself, a temperature of the environment surrounding the second radio communications subsystem 202B, both, or some combination thereof depending on the positioning of the temperature sensor 214. In some embodiments, the electronic processor 204A may further utilize one or more readings from the one or more sensors 210A that are indicative of or correlate to the temperature of the second radio communications subsystem 202B in one or more blocks of the method 300 in addition to the temperature sensor 214. At block 310, the electronic processor 204A compares the temperature to at least one predetermined temperature threshold. The one or more predetermined temperature thresholds may be stored in an electronic memory of the communications device 200 (for example, the memory 206A). In some embodiments, at least one predetermined threshold temperature is included in a look-up table of the first radio communications subsystem 202A. The one or more predetermined thresholds may be or include a maximum temperature threshold. In one example, the maximum threshold corresponds to a maximum operating temperature of the second radio communications subsystem 202B. In some embodiments, the maximum temperature threshold is approximately 60° C. In other embodiments, the one or more predetermined thresholds are or include a minimum temperature threshold. The minimum threshold corresponds to a minimum operating temperature of the second radio communications subsystem 202B. In some embodiments, the minimum temperature threshold is approximately −30° C.

At block 320, the electronic processor 204A deactivates the second radio communications subsystem 202B when the temperature exceeds a predetermined threshold of the one or more predetermined thresholds (for example, the temperature is greater than the maximum threshold or the temperature is lower than the minimum threshold). The electronic processor 204A may deactivate the second radio communications subsystem 202B directly or indirectly. For example, the electronic processor 204A may interrupt a power supply to the second radio communications subsystem 202B or transmit a command to the second radio communications subsystem 202B. In some embodiments, the method the electronic processor 204A implements to deactivate the second radio communications subsystem 202B depends on the operating status of the second radio communications subsystem 202B. For example, if the second radio communications subsystem 202B is off, is just turning on, or is in a state where the processor 204B is unable to receive communications from the electronic processor 204A, the processor 204B may deactivate the second radio communications subsystem 202B by interrupting the power supply to the subsystem 202B. In some embodiments, when deactivation of the second radio communications subsystem 202B includes transmitting a command to the subsystem 202B, the command from the subsystem 202A is a command to shut down or to go into a standby mode (in other words, to stop radio communications over the network 104). By deactivating the subsystem 202B, the subsystem 202B is kept from operating in or at a temperature that would cause damage to the subsystem 202B. Deactivation of the subsystem 202B may also keep the temperature in which the radio communications subsystem 202A is operating at or in from increasing due to the heat generated by the subsystem 202B when operating. It should be understood that, in some embodiments, during normal operation of the subsystems 202A and 202B of device 200, either or both subsystems 202A and 202B may be implementing its own thermal mitigation procedures.

Figure 4:
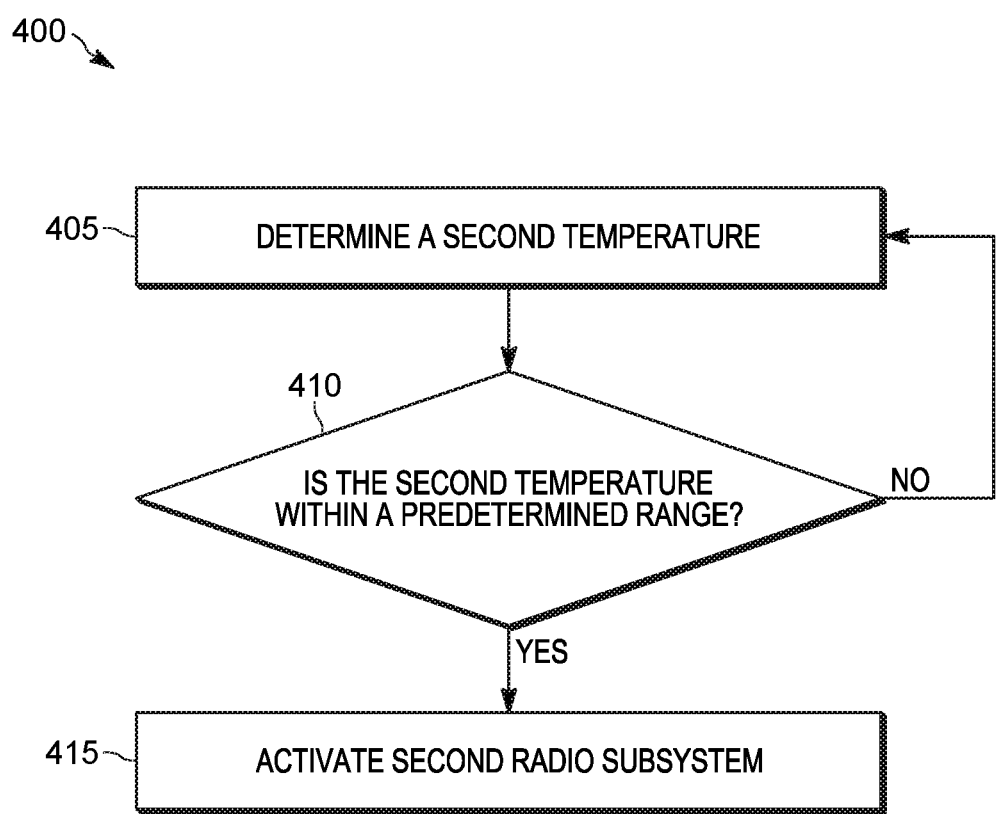
FIG. 4 is a flowchart of a second part of method implemented by the converged communications device of FIG. 2 continuing from the method illustrated in FIG. 3.

FIG. 4 is a flowchart illustrating a method 400 of activating the second radio communications subsystem 202B following block 315 of the method 300. Method 400 is also implemented by the subsystem 202A (specifically, the electronic processor 204A). Again, the electronic processor 204A may further utilize one or more readings from the one or more sensors 210A that are indicative of or correlate to the temperature of the second radio communications subsystem 202B in one or more blocks of the method 400 in addition to the temperature sensor 214. At block 405, the electronic processor 204A determines, via the temperature sensor 214, a second temperature. At block 410, the electronic processor 204A determines if the second temperature is inside of a predetermined range from the predetermined temperature threshold. As explained in more detail below (in regard to FIGS. 5 and 6), the predetermined range, in some embodiments, is determined based on a temperature measurement received from the processor 204B. When the second temperature is outside the predetermined range, the method 400 determines another temperature, returning to block 405. When the second temperature is within the predetermined range, the electronic processor 204A activates the second radio communications subsystem 202B.

Figure 5:
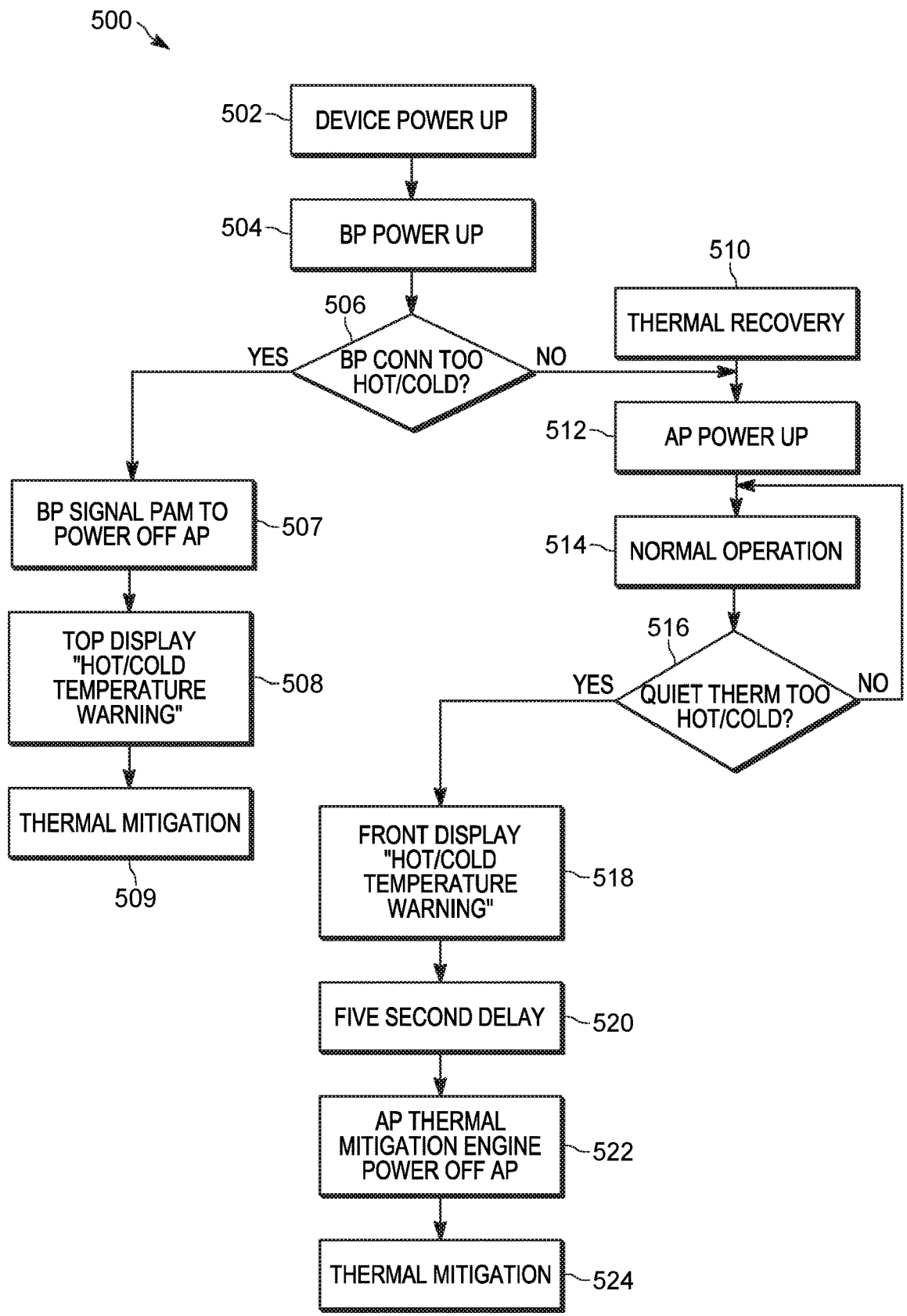
FIG. 5 is a flowchart of a method of thermal mitigation implemented by the converged communications device of FIG. 2 in accordance with some embodiments.
Figure 6:
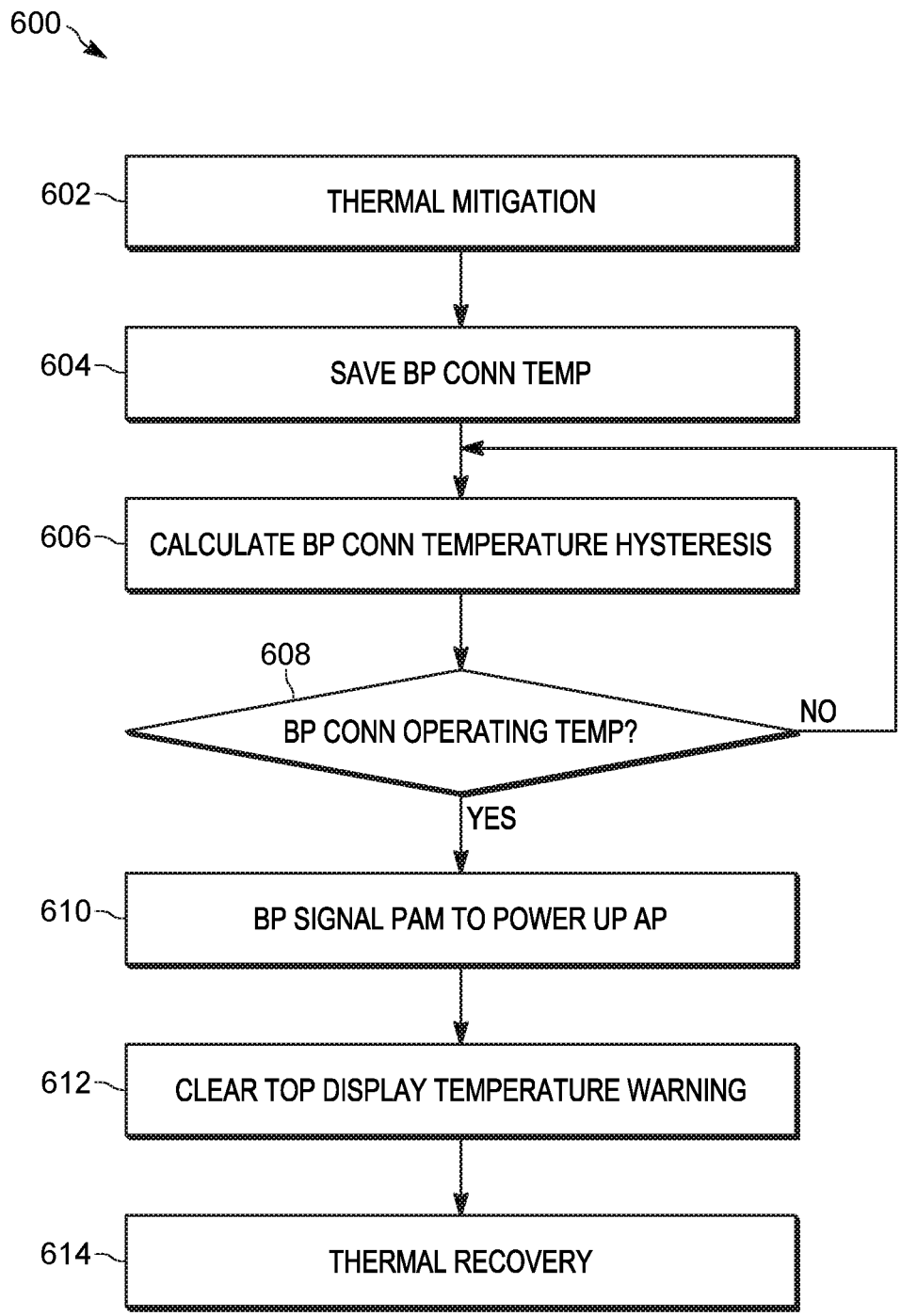
FIG. 6 is a flowchart of a method implemented by the converged communications device of FIG. 2 continuing from the method of FIG. 5 in accordance with some embodiments.

FIG. 5 is a flowchart of a method 500 in accordance to some embodiments. The method 500 includes the steps of the method 300 along with additional steps. For clarity, the blocks 504, 506, 507, 508, and 509 are the method 300 applied when the device 200 first receives a command to power on (block 502). The blocks 512, 514, 516, 518, and 520 are the method 300 applied when the second radio communications subsystem 202B is powered on following the decision at block 506 and/or when the second radio subsystem 202B is activated following the method 600 of FIG. 6. The method 600 is the method 300 according to further embodiments. The method 600, described in more detail below in regard to FIG. 6, is the method 300 following the second radio communications subsystem 202B being deactivated and/or prevented from being activated at blocks 507 and 522 respectively of method 500 of FIG. 5.

Returning to FIG. 5, the method 500 is described in terms of the electronic processor 204A of the first radio communications subsystem 202A and the electronic processor 204B of the second radio communications subsystem 202B. For example, blocks 504, 506, 507, and 508 are performed by the electronic processor 204A (referred to in FIGS. 5 and 6 as baseband processor BP) and blocks 512, 514, 513, 518, 520, and 522 are performed by the electronic processor 204B (referred to in FIGS. 5 and 6 as applications processor AP). Blocks 509 and 524 are the process 600 of FIG. 6.

At block 504, the first radio communications subsystem 202A turns on and, at block 506, the electronic processor 204A determines, via temperature sensor 214, whether the temperature of the second radio communications subsystem 202B exceeds one of the predetermined thresholds. In other words, the electronic processor 204A determines whether the temperature surrounding or the temperature of the second radio communications subsystem 202B is too hot or too cold for the radio communications subsystem 202B to activate and/or operate in. When the temperature exceeds one of the predetermined temperature thresholds, the first radio communications subsystem 202A deactivates the second radio communications subsystem 202B (block 507). Here, the first radio communications subsystem 202A prevents the second radio communications subsystem from activating as the device 200 is powered up (block 502) For example, at block 507, the electronic processor 204A deactivates power to the second radio communications subsystem 202B by, for example, signaling a power management system (not shown) of the device 200 to discontinue power to the second radio communications subsystem 202B. The electronic processor 204A may then optionally display, on a display (not shown) of the device 200, a warning that a temperature sensed has exceeded a predetermined temperature threshold (block 508). In some embodiments, prior to deactivation, the processor 204B may communicate, to the electronic processor 204A, a temperature sensed by one of the sensors 210B of the second radio communications subsystem 202B. The method 500 then proceeds at block 602 of FIG. 6 described in more detail below (block 509).

Continuing with FIG. 5, when the temperature (sensed by the temperature sensor 214) fails to exceed at least one of the predetermined temperature thresholds, the second radio communications subsystem 202B powers up at block 512 and operates normally (block 514) while evaluating, via processor 204B, temperatures sensed by the one or more temperature sensors 210B (block 516). When a temperature exceeds one or more of a predetermined temperature threshold, the processor 204B performs one or more thermal mitigation actions (block 522 and block 524). In some embodiments, the processor 204B displays, via a display (not shown) of the communications device 200, a warning that the temperature of the radio communications subsystem 202B has exceeded a predetermined temperature threshold (block 518) and, after an optional delay (block 520), the processor 204B shuts down the radio communications subsystem 202B (block 522). In some embodiments, just before or during deactivation, the second radio communications subsystem 202B may communicate, to the electronic processor 204A, a temperature sensed by one or more of its temperature sensors 210B as described in more detail below (for example, during the delay 520).

FIG. 6 is a flowchart illustrating a method 600 of activating the second radio communications subsystem 202B following deactivation, similar to the method 400 of FIG. 4. The method 600 may be implemented at or following the deactivation of the second radio communications subsystem 202B as indicated at block 602 (for example, block 509 or block 524 of the method 500 of FIG. 5). The method 600 is described in terms of the electronic processor 204A of the first radio communications subsystem 202A. For example, blocks 604, 606, 608, 610, and 612 are performed by the electronic processor 204A. As the second radio communications subsystem 202B is deactivating, the electronic processor 204A stores a third temperature sensed by the temperature sensor 214 (block 604), referred to herein as a reference temperature. At block 606, the electronic processor 204A determines a range from the predetermined temperature threshold. In the illustrated embodiment, the electronic processor 204A determines a hysteresis of the temperature sensed by the temperature sensor 214. The processor 204A compares the reference temperature to a fourth temperature (the temperature sensed by one of the sensors 210B of the second radio communications subsystem 202B received by the electronic processor 204A before deactivation of the subsystem 202B as mentioned above). Based on the difference between these two temperatures, the processor determines the range (for example, a hysteresis threshold value) based on the predetermined threshold that the first temperature exceeded at block 506 or 516. For example, if the difference between the two temperatures is less than or equal to two degrees, the range may be a large range (for example, 8 degrees). When the difference is greater than two degrees, a smaller range may be set (for example, three degrees) so as to create a hysteresis such that unintended performance cycling is prevented, including rapid activation and deactivation events. Because the size of the range is based on the magnitude of the difference between the two temperatures, the difference between the actual temperature of the subsystem 202B sensed by one of the sensors 210B and the inferred temperature sensed by the temperature sensor 214 is mitigated in the determination of when the subsystem 202B may be activated again. In embodiments where a temperature from the processor 204B is not received at the electronic processor 204A, the range may be determined based on the reference temperature and a predetermined value. The range itself correlates to a temperature value that is considered to be a safe temperature for the second radio communications subsystem 202B to operate it.

At block 608, the electronic processor 204A receives a temperature from the temperature sensor 214 and determines whether the sensed temperature is inside the range determined at block 606. When the temperature is within the range, the electronic processor 204A reactivates the second radio communications subsystem 202B. For example, in the illustrated embodiment, the electronic processor 204A transmits a command to the power management system of the device 200 to provide power to the radio communications subsystem 202B (block 610) and, optionally, at block 612, clear the temperature warning of block 508 or block 518. The process then returns to block 510 of method 500 as indicated by block 612.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communications device comprising:
  a first radio communications subsystem configured to operate according to a first radio communications protocol;
  a second radio communications subsystem configured to operate according to a second radio communications protocol that is a different protocol than the first radio communications protocol; and
  a temperature sensor
  the first radio communications subsystem including
    an electronic processor configured to
      determine, via the temperature sensor, a first temperature indicative of a temperature of the second radio communications subsystem,
      compare the first temperature to at least one predetermined temperature threshold,
      deactivate the second radio communications subsystem when the first temperature exceeds a predetermined temperature threshold of the at least one predetermined temperature threshold, determine a second temperature in response to the second radio communications subsystem performing a shutdown, determine, via the temperature sensor, a third temperature indicative of the temperature of the second radio communications subsystem, and activate the second radio communications subsystem, when the third temperature is within a predetermined range, the predetermined range being based on the predetermined temperature threshold, wherein the predetermined range is determined based on a difference between the second temperature and a fourth temperature received from the second radio communications subsystem that correlates to a temperature sensed by a second temperature sensor of the second radio communications subsystem during the shutdown.

2. The radio communications device of claim 1, wherein the temperature sensor is positioned outside of the second radio communications subsystem.

3. The radio communications device of claim 1, wherein the temperature sensor is positioned within the second radio communications subsystem.

4. The radio communications device of claim 1, wherein the predetermined temperature threshold corresponds to a maximum operating temperature of the second radio communications subsystem.

5. The radio communications device of claim 1, wherein the predetermined temperature threshold corresponds to a minimum operating temperature of the second radio communications subsystem.

6. The radio communications device of claim 1, wherein the at least one predetermined threshold temperature is included in a look-up table of the first radio communications subsystem.

7. The radio communications device of claim 1, wherein the first radio communications protocol is a land mobile radio protocol and the second radio communications protocol is a broadband protocol.

8. A method of thermal mitigation in a communications device, the method comprising:

determining, via a temperature sensor, a first temperature indicative of a temperature of a second radio communications subsystem configured to operate according to a second radio communications protocol that is a different protocol than a first radio communications protocol of a first radio communications subsystem, comparing the first temperature to at least one predetermined temperature threshold, deactivating the second radio communications subsystem when the first temperature exceeds a predetermined temperature threshold of the at least one predetermined temperature threshold, determining a second temperature in response to the second radio communications subsystem performing a shutdown, determining, via the temperature sensor, a third temperature indicative of the temperature of the second radio communications subsystem, and activating the second radio communications subsystem, when the third temperature is within a predetermined range, the predetermined range being based on the predetermined temperature threshold, wherein the predetermined range is determined based on a difference between the second temperature and a fourth temperature received from the second radio communications subsystem that correlates to a temperature sensed by a second temperature sensor of the second radio communications subsystem during the shutdown.

9. The method of claim 8, wherein the temperature sensor is positioned outside of the second radio communications subsystem.

10. The method of claim 8, wherein the temperature sensor is positioned within the second radio communications subsystem.

11. The method of claim 8, wherein the predetermined temperature threshold corresponds to a maximum operating temperature of the second radio communications subsystem.

12. The method of claim 8, wherein the predetermined temperature threshold corresponds to a minimum operating temperature of the second radio communications subsystem.

13. The method of claim 8, wherein the at least one predetermined threshold temperature is included in a look-up table of the first radio communications subsystem.

14. The method of claim 8, wherein the first radio communications protocol is a land mobile radio protocol and the second radio communications protocol standard is a broadband protocol.

* * * * *